United States Patent Office 3,145,471
Patented Aug. 25, 1964

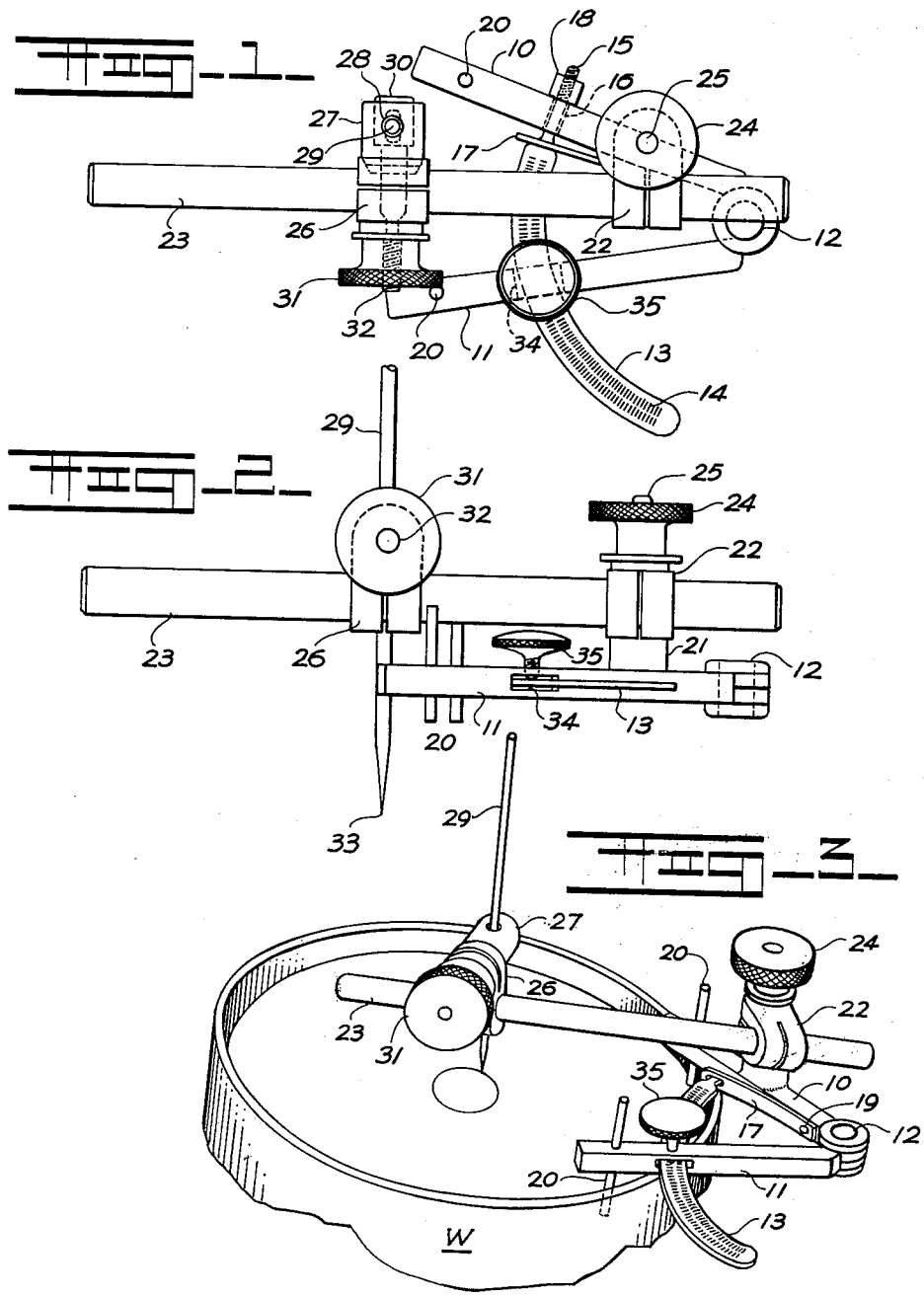

3,145,471
CENTER FINDING TOOL
Paul W. Zander, 4711 Norquest Blvd., Youngstown, Ohio
Filed July 21, 1961, Ser. No. 125,813
3 Claims. (Cl. 33—42)

This invention relates to a center finding tool and more particularly to a device for establishing centers in machined holes.

The principal object of the invention is the provision of a device for accurately establishing centers in machined holes.

A further object of the invention is the provision of a device that may be used for inspecting machine holes to determine center accuracy and that may be used for layout and inspection of finished and cored holes in castings or workpieces.

A still further object of the invention is the provision of a center finding tool that may be easily adjusted and used in connection with holes of various diameters.

A still further object of the invention is the provision of a center finding tool that will determine the exact center of machined holes.

The center finding tool disclosed herein comprises an efficient and easily used tool which may be conveniently used by a machinist, draftsman or layout man in determining the exact centers of various holes in various workpieces. Those skilled in the art will be familiar with the common practice of positioning a wooden member or the like across an opening or hole and then finding the approximate center of the hole or opening by establishing a point on the wooden member. Other center finding tools have been proposed which include rather cumbersome mechanisms utilizing extensible arms and these devices while sometimes workable are of necessity limited to use with a relatively small range of opening sizes. The present invention comprises a tool which may be used with various sized openings and which will easily and quickly determine the exact center point thereof which is particularly desirable when machining workpieces which must be bolted to one another with the centers of registering openings in exact alignment for the subsequent reception of other parts such as shafts and the like.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a top plan view of the center finding tool.
FIGURE 2 is a side elevation thereof.
FIGURE 3 is a perspective view of the center finding tool in position on a workpiece.

By referring to the drawings and FIGURES 1 and 2 in particular, it will be seen that the center finding tool comprises a pivoted V-shaped member including arms 10 and 11 and a pivot 12 joining them to one another in the nature of a compass and which arms are adjustably secured to one another by an arcuate member 13 which is provided with a scale 14 thereon. The arcuate member has a threaded extension 15 on one end which is positioned through an opening 16 in the arm 10 and secured in tensioned relation thereto by a leaf spring 17 and a nut 18 which are engaged on the extension 15 on the opposite sides of the arm 10. The leaf spring 17 is secured at one end to the arm 10 as by a rivet 19 as best seen in FIGURE 3 of the drawings.

Guide pins 20, 20 are positioned through vertical openings in the outer ends of the arms 10 and 11 respectively and are held by frictional engagement therewith while being capable of being moved relative thereto.

A first friction clamp 21 is attached to the arm 10 outwardly from the pivot 12 and has a horizontally disposed U-shaped upper section 22 which is provided with a transverse opening between the arms of the U-shaped section 22 for positioning an elongated round rod 23 which is of a length approximately double the length of either of the arms 10 and 11 heretofore referred to. The U-shaped portion 22 of the clamp 21 is actuated by a knurled nut 24 which is engaged on a threaded bolt 25 the lower portion of which is engaged in the clamp body 21 and the upper portion of which extends through a vertical opening in the U-shaped portion 22. It will thus be seen that when the round rod 23 is positioned through the clamp 22 it may be secured thereto in desired position by simply tightening the knurled nut 24.

A secondary clamp comprising a U-shaped member 26 is positioned on the round rod 23 and has an extension 27 on one side thereof which is apertured vertically as at 28 for the reception of an elongated indicating pin 29. An apertured bolt 30 is positioned through a passageway in the extension 27 and through the U-shaped clamp 26 and receives a secondary knurled nut 31 on its outermost threaded end 32. By tightening the nut 31 the indicating pin 29 may be secured in the apertured bolt 30 and the extension 27 in desirable position. The indicating pin 29 is pointed at its lowermost end or point 33 and forms an indicator when the tool is used for determining the center of an opening or the like.

Still referring to FIGURES 1 and 2, it will be seen that the arm 11 of the compass-like body of the center finding tool has a transverse slot 34 therethrough through which one end of the arcuate member β extends. A set screw 35 is threadably engaged in an opening in the arm 11 so as to engage the arcuate member 13 so that the same can be secured relative to said arm 11.

It will thus be seen that the center finding tool comprises the compass-like pivoted arms 10 and 11 adjustably secured to ane another by the arcuate member 13 and mounting in an adjustable manner the round rod 23 upon which is adjustably positioned the clamping member 26 which in turn positions the elongated indicating pin 29.

In using the center finding tool the arms 10 and 11 are set to span an appropriate portion or radius such as the workpiece indicated at W in FIGURE 3 whereupon the guide pins 20 may be engaged against the inside surface of a flange on the workpiece or the exterior surface thereto or alternately against a circular wall of the workpiece defining an opening therethrough. The indicating pin 29 is then positioned appropriately on the round rod 23 and the device is moved in a circular motion around the workpiece with the guide pins 20 in engagement thereagainst whereupon the point 33 of the elongated indicating pin 29 will describe an exactly centered circle or determine the exact center of the opening.

It will thus be seen that a center finding tool meeting the several objects of the invention has been disclosed and having thus described my invention, what I claim is:

1. A center finding tool comprising a pair of arms pivoted to one another at one of their ends, guide pins positioned in openings in said arms adjacent their opposite ends, an interconnecting member engaged in transverse openings in said arms intermediate their ends and means adjustably securing said interconnecting member to said arms, a clamping member pivotally mounted on one of said arms, a rod adjustably positioned in said clamping member in spaced relation to said arm, a secondary clamping member movably mounted on said rod and an indicating pin positioned in said secondary clamping member.

2. The center finding tool set forth in claim 1 and wherein said first-mentioned clamping member is pivotally mounted on said arm between the transverse opening therein and the pivotal connection of said arms.

3. The center finding tool set forth in claim 1 and wherein said first-mentioned clamping member is pivotally mounted on said arm in spaced relation to said pivotal connection between said arm.

References Cited in the file of this patent

UNITED STATES PATENTS

| | | |
|---|---|---|
| 79,052 | Blaisdell | June 23, 1868 |
| 801,965 | Bernard | Oct. 17, 1905 |
| 1,262,433 | Beeck | Apr. 9, 1918 |
| 1,629,426 | Weller | May 17, 1927 |
| 2,046,508 | Friess | July 7, 1936 |
| 2,394,404 | Rawald | Feb. 5, 1946 |
| 2,717,446 | Gomes | Sept. 13, 1955 |
| 3,052,033 | Studt | Sept. 4, 1962 |

FOREIGN PATENTS

| | | |
|---|---|---|
| 1,107,603 | France | Aug. 10, 1953 |